United States Patent [19]

Burns

[11] Patent Number: 4,889,904

[45] Date of Patent: Dec. 26, 1989

[54] PROCESS FOR THE PREPARATION OF METHYLPOLYSILANES HAVING CONTROLLED CARBON CONTENT

[75] Inventor: Gary T. Burns, Midland, Mich.

[73] Assignee: Dow Corning Corporation, Midland, Mich.

[21] Appl. No.: 223,007

[22] Filed: Jul. 22, 1988

[51] Int. Cl.[4] ............................................. C08G 77/06
[52] U.S. Cl. ......................................... 528/25; 528/33; 556/430; 423/345; 501/88
[58] Field of Search .................... 528/25, 33; 556/430

[56] References Cited

U.S. PATENT DOCUMENTS

| | | | |
|---|---|---|---|
| 4,298,558 | 11/1981 | Baney et al. | 264/65 |
| 4,298,559 | 11/1981 | Baney et al. | 264/65 |
| 4,310,651 | 1/1982 | Baney et al. | 528/21 |
| 4,546,163 | 10/1985 | Haluska | 528/14 |
| 4,667,046 | 5/1987 | Frey et al. | 556/430 |

OTHER PUBLICATIONS

Watanabe et al. J.C.S. Chem. Comm. 534 (1977).
Watanabe et al., 128 J. Organometallic Chem. 173 (1977).
Watanabe et al., J.C.S. Chem. Comm 704 (1977).
Watanabe et al., J.C.S. Chem. Comm. 1029 (1978).
Watanabe et al., 218 J. Organometallic Chem. 27 (1981).
Watanabe et al., 244 J. Organometallic Chem. 329 (1983).
Atwell et al., 7 J. Organometallic Chem. 71 (1967).

*Primary Examiner*—Melvyn I. Marquis
*Attorney, Agent, or Firm*—Killworth, Gottman Hagan & Schaeff

[57] ABSTRACT

A process for the preparation of a methylpolysilane having a controlled carbon content is provided which includes the steps of heating together to form a reaction mixture at leasdt one alkoxy-functional disilane selected from the group consisting of disilanes having two, three, and four alkoxy groups bonded to the silicon atoms, and mixtures thereof, with either an alkoxy-functional silane having at least one unsaturated substituent or an unsaturated hydrocarbon compound in an amount effective to increase the carbon content of the resulting polymer. The reaction is carried out in the presence of a catalyst which is a source of alkoxide ions. The methylpolysilane polymers produced may be pyrolyzed to form ceramic compositions having increased carbon contents. The ceramics may find use as films, fibers, and coatings, as well as the many other uses to which silicon carbide ceramics have heretofore been put.

18 Claims, No Drawings

PROCESS FOR THE PREPARATION OF METHYLPOLYSILANES HAVING CONTROLLED CARBON CONTENT

BACKGROUND OF THE INVENTION

The present invention relates to the preparation of ceramic chars having increased carbon contents which are derived from methylpolysilanes, and more particularly to a method of preparing such methylpolysilanes by a catalyzed redistribution of alkoxydisilanes, and the methylpolysilanes and ceramic materials produced thereby.

In recent years, workers in the art have developed procedures for the preparation of silicon carbide ceramic materials from polymeric silane precursors such as methylpolysilanes by pyrolyzing the polymers to form ceramic chars. Silicon carbide possesses a number of desirable properties such as chemical inertness, semiconducting properties, extreme hardness and stability at very high temperatures. Accordingly, silicon carbide ceramics have found use in electrical heating units, furnace walls, mufflers, abrasives, rocket nozzles, and automotive and turbine engine parts. Further, it has been found that the use of polymeric precursors permits the formation of fibers and thin films or coatings of silicon carbide which were heretofore extremely difficult to form using inorganic sources of silicon carbide.

However, for many of the above applications to be successful, the composition of the polymer, and the ceramic char derived therefrom, needs to be controlled. Specifically, to provide suitable ceramic materials from such polymers, the carbon content of the polymers, and their resulting chars, must be controlled to increase the carbon content. This provides a ceramic material with a carbon to silicon ratio of closer to 1:1. In some instances it may even be desirable to have a slight excess of carbon. However, not only must the carbon be added to the polymer, but it must be incorporated in such a way that it is not lost from the polymer during pyrolysis to form the ceramic char.

Baney et al, U.S. Pat. No. 4,310,651, teach a procedure for the preparation of methylpolysilanes having halogen substituents through a catalyzed redistribution reaction utilizing tetrabutylphosphonium chloride as the catalyst. Such methylpolysilanes are taught to be useful as ceramic precursors. The Baney et al process has the advantage of being able to utilize as a starting material the process residue from the direct synthesis of organochlorosilanes. Direct synthesis of organochlorosilanes involves passing the vapor of an organic chloride over heated silicon and a catalyst. See, Eaborn, Organosilicon Compounds, Butterworths Scientific Publications, 1960, page 1. This residue contains a mixture of di-, tri-, and tetra-substituted halodisilanes.

However, the halogen substituents on the methylpolysilanes of the Baney et al process have resulted in some difficulties in handling the compositions which tend to auto-ignite when exposed to oxygen or moisture. Moreover, pyrolysis of the compositions releases large quantities of corrosive HCl or HBr gases which must be handled and properly disposed of.

Baney et al, U.S. Pat. No. 4,298,558, teach an improved procedure which converts the halogen substituents on the methylpolysilanes to alkoxy or phenoxy substituents. Baney et al, U.S. Pat. No. 4,298,559, teach a procedure which converts the halogen substituents on the methylpolysilanes to alkyl or phenyl substituents. However, the improved procedures still require a two step process of converting halodisilanes to halo-substituted methylpolysilanes and then converting the halogen substituents to alkoxy, phenoxy, alkyl, or phenyl substituted compositions.

Haluska, U.S. Pat. No. 4,546,163, teaches a procedure for forming vinyl-containing polysilanes by reacting alkyl halodisilanes with a halosilane containing a vinyl group. The resulting polymers are taught to be useful as ceramic precursors. Again, however, halogen-containing starting materials must be utilized.

Other workers have attempted to produce methylpolysilanes by a single step redistribution reaction using methoxydisilane starting materials. For example, Ryan et al, 84 J. Amer.Chem.Soc. 4730 (1962), reported the redistribution of 1,1,2,2-tetramethoxy-1,2-dimethyldisilane to higher polysilanes in the presence of sodium metal. Watanabe et al, in a series of published reports, taught that metal alkoxide catalysts could be used in the redistribution reaction. See, e.g., Watanabe et al, J. C. S. Chem. Comm. (1977) 534; Watanabe et al, J. C. S. Chem. Comm. (1977) 704; Watanabe et al, 128 J. Organometallic Chem. 173 (1977); Watanabe et al, J. C. S. Chem. Comm., (1978) 1029; Watanabe et al, 218 J. Organometallic Chem. 27 (1981); and Watanabe et al, 244 J. Organometallic Chem. 329 (1983).

Atwell et al, 7 J. Organometallic Chem. 71 (1967), have also reported the redistribution of alkoxy disilanes to higher organopolysilanes. However, in the Watanabe and Atwell reports, the higher organopolysilane was either uncharacterized, unidentified, or was of a low molecular weight (less than 6 silicon atoms in the chain).

More recently, Frey et al, U.S. Pat. No. 4,667,046, teach a method for preparing higher molecular weight methylpolysilanes by reacting a trialkoxy-substituted disilane, and optionally a tetraalkoxy-substituted disilane, with a silane having at least one silicon to hydrogen bond in the presence of an alkali metal alkoxide catalyst. The methylpolysilanes are taught to be useful as negative photoresist coatings and ceramic precursors.

However, the prior art does not teach a process for controlling or increasing the carbon content of ceramic precursor polymers and maintaining that additional carbon content in the ceramic char. Accordingly, the need still exists in the art for a process for the preparation of ceramic precursor polymers which have increased carbon contents in both the polymer and the resultant ceramic char.

SUMMARY OF THE INVENTION

The present invention meets that need by providing methylpolysilane polymers having controlled carbon contents. The increased carbon contents of the polymers are carried over into the ceramic char formed during pyrolysis of the polymer to provide ceramic materials having controllable and increased carbon content.

In accordance with one aspect of the present invention, a process for the preparation of a methylpolysilane having a controlled carbon content is provided which includes the steps of heating together to form a reaction mixture at least one alkoxy-functional disilane selected from the group consisting of disilanes having two, three, and four-alkoxy groups bonded to silicon atoms, and mixtures thereof, with an alkoxy-functional silane having at least one unsaturated substituent in an amount effective to increase the carbon content of the resulting polymer. The alkoxy-functional silane preferably has a boiling point which is greater than that of the by-produced silanes which result from the redistribution reaction. This boiling point will generally be greater than about 110° C., and most preferably greater than about 125° C. The reaction is carried out in the presence of a catalyst which is a source of alkoxide ions.

As the reaction proceeds, by-produced volatile alkoxysilane materials are removed from the reaction mixture. The mixture is reacted for a time sufficient for an alkoxy-functional methylpolysilane having the alkoxy-functional silane incorporated therein to form. The catalyst may then be separated from the alkoxy-functional methylpolysilane which has formed by any suitable means such as by dissolving the reaction product in a solvent and filtering to remove the catalyst.

The alkoxy-functional silane is one having doubly or triply bonded carbon to carbon atoms therein and may be selected from the group consisting of vinyl silanes, aryl silanes, and arylalkyl silanes. Preferably, the silane includes an aryl group as this provides an effective way of increasing the carbon content in the polymer. Silanes having more than one unsaturated group thereon are also suitable for use in the present invention such as, for example, dimethoxyphenylvinylsilane. The alkoxy-functional silane is preferably added in an amount of between about 1 to about 20 mole % of the alkoxy-functional disilane, and most preferably in an amount of between about 5 to about 15 mole % of the alkoxy-functional disilane. It has been found that these mole percentages result in methylpolysilanes and ceramic chars derived therefrom having increased carbon contents.

The reaction is preferably carried out at a temperature of between about 200° to about 320° C., at which temperature the volatile monomer by-products may be distilled from the reaction mixture. Most preferably, the reaction is carried out at a temperature of between about 250° to about 300° C. Some care must be taken in the heating of the reaction mixture. It is preferred that the reaction mixture is heated at a rate of between about 1° to about 5° C. per minute.

The catalyst is a source, either directly or indirectly, of alkoxide ions such as an alkali metal methoxide or alkali metal alkoxide having from 1 to 6 carbon atoms. It is preferably present in an amount of between about 0.1 to about 10.0%, and most preferably about 1.0% by weight. The alkoxydisilane starting materials preferably have from 1 to 4 carbon atoms in the alkoxy substituents. Methoxy and ethoxy substitutents are most preferred.

In another embodiment of the invention, a process for the preparation of a methylpolysilane having a controlled carbon content is provided which includes the steps of heating together to form a reaction mixture at least one alkoxy-functional disilane selected from the group consisting of disilanes having two, three, and four alkoxy groups bonded to the silicon atoms, and mixtures thereof, with an unsaturated hydrocarbon compound in an amount effective to increase the carbon content of the resulting polymer. The unsaturated hydrocarbon compound preferably has a boiling point which is greater than the boiling point of the by-produced silanes which result from the redistribution reaction. This boiling point is generally at least about 110° C., and may be greater than about 125° C. The reaction mixture is heated in the presence of a catalyst which is a source of alkoxide ions.

As the reaction proceeds, by-produced volatile alkoxysilane materials are separated from the reaction mixture. The mixture is reacted for a time sufficient for an alkoxy-functional methylpolysilane having the unsaturated hydrocarbon compound incorporated therein to form. The catalyst may then be separated from the alkoxy-functional methylpolysilane which has formed by any suitable means.

The unsaturated hydrocarbon compound preferably includes aryl groups and may also contain doubly or triply bonded carbon to carbon atoms. Preferred unsaturated compounds are selected from the group consisting of phenylacetylene, divinylbenzene, and diphenylacetylene. These unsaturated compounds have sufficiently high boiling points that they are not distilled off during the reaction. The unsaturated hydrocarbon compound is preferably added in an amount of between about 1 to about 20 mole % of the alkoxy-functional disilane and most preferably in an amount of between about 5 to about 15 mole % of the alkoxy-functional disilane.

The methylpolysilane polymers produced by either of the embodiments of the present invention may be pyrolyzed to form ceramic compositions having increased carbon contents. The ceramics may find use as films, fibers, and coatings, as well as the many other uses to which silicon carbide ceramics have heretofore been put. Being halogen free, the methylpolysilanes of the present invention are less corrosive to equipment and do not generate HCl or HBr gases when pyrolyzed.

Accordingly, it is an object of the present invention to provide methylpolysilane polymers having increased carbon contents. It is also an object of the invention that the increased carbon contents of the polymers be carried over into the ceramic char formed during pyrolysis of the polymer to provide ceramic materials having controlled and increased carbon content. These, and other objects and advantages of the present invention, will become apparent from the following detailed description and the appended claims.

DESCRIPTION OF THE PREFERRED EMBODIMENTS

The present invention involves the catalyzed redistribution of certain alkoxy-functional disilane starting materials to form methylpolysilanes having alkoxy substituents and polymer chain lengths of greater than seven silicon atoms. Also included in the starting materials are certain alkoxy-functional silanes having at least one unsaturated substituent or, alternatively, certain unsaturated hydrocarbon compounds. These latter starting materials are incorporated into the polymer during the redistribution reaction and provide methylpolysilanes having increased carbon contents.

The starting materials include di-, tri-, and tetra- alkoxy substituted disilanes having from 1 to 4 carbons in the alkoxy group. Methoxy and ethoxy functional groups are preferred. Specific alkoxy functional disilanes which are suitable for use in the present invention include, but are not limited to, 1,1-dimethoxy-1,2,2,2-tetramethyl disilane, 1,2-dimethoxy-1,1,2,2-tetramethyl disilane, 1,2-dimethyl-1,1,2,2-tetramethoxy disilane, and 1,1,2-trimethoxy-1,2,2-trimethyl disilane.

The alkoxy functional disilanes may be prepared by reacting the corresponding chloro-substituted disilanes with the corresponding alcohol or trialkyl orthoformate in accordance with the procedure taught by Watanabe et al, 128 J. Organometallic Chem. 173 (1977). A source of chloro-substituted disilanes is as a component of the residue from the direct synthesis process for organochlorosilanes. In practice, the disilanes in the residue are separated from monomeric silanes by a simple distillation process.

The alkoxy-functional silane starting materials which provide the increased carbon content in the polymer and resultant ceramic char after pyrolysis are those silanes having unsaturated substituents containing doubly or triply bonded carbon to carbon atoms. They may be selected from the group consisting of vinyl silanes, aryl silanes, and arylalkyl silanes. Preferably, the silane contains an aryl group as this provides additional carbon content to the polymer. Alkoxy-functional silanes suitable for use include those containing more than one unsaturated group such as dimethoxyphenylvinylsilane.

The unsaturated hydrocarbon compounds used in an alternative embodiment as starting materials in place of the alkoxy-functional silanes also preferably include aryl groups, and may contain more than one unsaturated group. Preferred compounds include, but are not limited to phenylacetylene, divinylbenzene, and diphenylacetylene.

These alkoxy-functional silanes and unsaturated hydrocarbon compounds have sufficiently high boiling points that they are not distilled off during the redistribution reaction. Generally, the volatile monomeric silanes produced as by-products of the redistribution reaction will be composed chiefly of dimethyldimethoxy silane and methyltrimethoxy silane. The former boils at 82° C., while the latter boils at between 102° and 103° C. Accordingly, it is preferred that the unsaturated starting materials have boiling points of at least about 110° C., and even more preferably somewhat above about 125° C. to insure that the volatile by-products can be distilled from the remainder of the reaction mixture as the mixture is heated.

The unsaturated alkoxy-functional silanes or unsaturated hydrocarbon compounds are added to the reaction mixture in an amount which is effective to increase the carbon content of the resulting methylpolysilane polymer. It has been found that the addition of from about 1 to about 20 mole % of the unsaturated silanes or hydrocarbon compounds, based on the disilane starting materials, is effective. Most preferably, about 5 to about 15 mole % of the unsaturated materials may be added.

The redistribution reaction is carried out by treating the starting materials with an amount of catalyst which is sufficient to initiate the redistribution reaction. This amount is preferably from about 0.1 to about 10.0% by weight, and most preferably about 1.0% by weight, of the catalyst. The catalyst in accordance with the process of the present invention is a nucleophile which is a source, either directly or indirectly, of alkoxide ions.

Direct sources of alkoxide ions includes alkali metal alkoxides such as lithium, potassium, or sodium methoxides or corresponding alkoxides. Preferably, the catalyst selected will have an alkoxide substituent which matches the substituents of the starting material. That is, for example, if methoxy functional disilanes are used as the starting material, an alkali metal methoxide catalyst is preferred. A catalyst capable of generating alkoxide ions in situ may also be used. Examples of suitable catalyst compositions include n-butyllithium or lithium, potassium, or sodium metal.

Either individual disilane compositions or mixtures thereof may be used as starting materials in the reaction. It is preferred, however, that when di-alkoxy disilanes are present in the starting material that at least some amount of tri- or tetra- alkoxy disilanes are also present to provide branching sites on the polymer. Generally, it is preferred to have at least 50 mole % of tri- and tetra-substituted alkoxy disilanes. The starting materials and catalyst are heated as a reaction mixture to a temperature at which by-produced monomeric silianes are distilled off from the redistribution reaction and separated therefrom.

The temperature of the reaction mixture must be sufficiently high to enable distillation and separation of monomeric by-products but not high enough to cause the reaction mixture to gel or solidify. A temperature range of about 200° to about 320° C. is preferred, with temperatures in the range of about 250° to about 300° C. being most preferred. It is believed that the preferred temperature range is higher than that practiced by the art previously. It has been found that where tetra-functional disilanes are used as the starting material, temperatures at the lower end of the range may be utilized. Where di-functional disilanes are used, temperatures at the higher end of the range are preferred.

The reaction may be carried out neat, or in the presence of a solvent such as tetrahydrofuran. The presence of a solvent during the initial stages of the reaction may tend to aid in accelerating the reaction. The solvent may be removed during the latter stages of the reaction. The reaction is carried out in an inert atmosphere. Argon is preferred; however, other inert gases such as nitrogen may be used. The reaction mixture must be protected from exposure either to oxygen or moisture The reaction is carried out for a time sufficient for all volatile by-products to be distilled from the reaction mixture. The rate of heating the reaction mixture should be sufficiently slow to enable fractionation of monomers from the dimers and oligomers forming in the reaction mixture. Heating rates of from about 1° to about 5° C. per minute have been found to be suitable.

After the reaction to form the methylpolysilanes is completed, the catalyst may be removed from the polymer by any suitable means. A preferred method of removal is by dissolving the polymer in a solvent which will not react with the methylpolysilane polymer such as for example, toluene, tetrahydrofuran, acetonitrile, or saturated hydrocarbons such as hexane or heptane. The solution may then be filtered to remove any catalyst.

The process of the present invention provides halogen free methylpolysilanes having an alkoxy functionality and which have an increased carbon content which are useful as ceramic precursors. The halogen free methylpolysilanes may be used directly, or may be derivatized by reacting the alkoxy functionality to provide methylpolysilanes with other functional groups. These may include reaction with an organo alkali metal such as methyl lithium to substitute alkyl groups for the alkoxy groups, reaction with a Grignard reagent (RMgBr) to substitute alkyl groups for the alkoxy groups, or reaction with an alkali metal hydride to substitute hydrido groups for the alkoxy groups. Additionally, if desired, a chloro or halogen functionality may be introduced by reacting with an acetyl chloride or halide. An amino functionality may be introduced into the methylpolysilanes by reacting the chloro or halogen groups with an amine such as monomethylamine.

The novel methylpolysilanes having an increased carbon content may then be pyrolyzed to form ceramics, also having an increased carbon content, by heating the polymer in an inert atmosphere at temperatures from about 1000° to about 1600° C. for about 0.1 to about 4 hours. Depending upon the functional groups on the polymer, silicon carbide as well as SiCN compounds can be formed.

In order that the invention may be more readily understood, reference is made to the following examples, which are intended to illustrate the invention, but are not to be taken as limiting the scope thereof.

Unless otherwise stated, all of the manipulations in these Examples were performed in dry glassware under an atmosphere of argon. Toluene was distilled from sodium under argon prior to use. $^1$H NMR spectra were recorded on either a Varian EM 360 or EM 390 spectrometer. FTIR spectra were recorded on a Nicolet 5 DX spectrometer. GPC data were obtained on a duPont Instruments GPC equipped with a Spectra Physics SP4100 Integrator and refractive index and ultraviolet light detectors from duPont Instruments. TGA and TMA data were recorded on a duPont 940 thermomechanical analyzer and an Omnitherm TGA interfaced to an Omnitherm 2066 computer. Gas chromatography was performed on a Varian 3700 GC equipped with a thermoconductivity detector using a ⅛ inch ×13 foot column packed with 15% OV-210 on acid-washed Chromasorb P. Oxygen analysis was performed on a LECO oxygen analyzer equipped with an Oxygen Determinator 316 (Model 783700) and an Electrode Furnace EF100. Silicon was determined by a fusion technique which consisted of converting the silicon material to soluble forms of silicon and analyzing the solute for total silicon by atomic absorption spectrometry. Carbon, hydrogen and nitrogen analyses were done on a Control Equipment Corporation 240-XA Elemental Analyzer. All percents are by weight unless otherwise indicated. A methyl group is designated by "Me".

EXAMPLE 1

A 1,2-dimethyl-1,1,2,2-tetramethoxydisilane was prepared using a modification of the procedure taught by Watanabe et al, 128 J. Organometallic Chem. 173 (1977). 1428 g (13.46 mole) of methyl orthoformate (HC(OMe)$_3$) was added dropwise to 672 g (2.95 mole) of 1,2-dimethyl-1,1,2,2-tetrachlorodisilane at 100° C. After all of the HC(OMe)$_3$ was added (approximately 6 hours) the temperature was increased to 120° C. and the reaction held at this temperature for 2 days. Fractional distillation of the reaction mixture at 80°-90°/27-35 torr gave 580 g (93.7% yield, 98.5% purity) of syn-(MeO)$_4$Si$_2$Me$_2$.

EXAMPLE 2

A methylpolysilane polymer was prepared using a mixture of tri- and tetra-alkoxy disilane starting materials. A 3-neck 100 mL round bottom flask fitted with an argon inlet, an overhead mechanical stirrer and a 6" vigreoux connected to a short path distillation head with a cooled (−78° C.) receiving flask was cooled to 0° C. and 6.8 mL of 1.55M butyllithium (BuLi) in hexane (0.0105 mole) added followed by 0.400 mL (0.32 g 0.01 mole) of absolute methanol. The flask was warmed to room temperature and 32.213 g of methoxydisilanes (30.8:42.6 GC area ratio of (MeO)$_2$MeSiSi(OMe)Me$_2$ and syn-(MeO)$_4$Si$_2$Me$_2$) added. Under a slow purge of argon, the reaction was heated to 300° C. (external thermocouple) over a period of 5 hours. The volatiles were collected in the cooled receiving flask. After 30 minutes at 300° C., the reaction was cooled to room temperature. After work-up according to Example 6, 5.65 g (17.5% yield) of a yellow, soluble resin was obtained. The distillate (23.97 g) consisted of 6.8 area % hexanes, 18.2 area % Me$_2$Si(OMe)$_2$ and 73.0 area % MeSi(OMe)$_3$.

The polymer was analyzed, and the results are reported below.

T$_g$=92.6° C.
TGA (1000° C., N$_w$)=44.6% residue
$^1$H NMR (CDCl$_3$), δ (ppm): 0.30 (center of broad singlet, SiMe), 3.47 (center of broad singlet, SiOMe), SiMe/SiOMe integration ratio=5.4/1.0
FTIR (thin film), cm$^{-1}$ (intensity): 2953 (m), 2889 (m), 2834 (m), 2074 (w), 1406 (m), 1244 (m), 1180 (w), 1074 (s), 835 (m), 766 (s), 681 (m), 519 (s).
GPC: M$_w$=4775, M$_n$=1786
Elemental Analysis: 55.1% Silicon, 32.3% carbon and 8.6% hydrogen

EXAMPLE 3

Using the apparatus, catalyst amounts and isolation procedure of Example 2, a methylpolysilane polymer was prepared incorporating 5 mole % of trimethyoxyphenylsilane (PhSi(OMe)$_3$). The reactants were 30.001 g of methoxydisilanes (30.8:42.6 GC area ratio of (MeO)$_2$ MeSiSi(OMe)Me$_2$ and syn-(MeO)$_4$Si$_2$Me$_2$) and 1.472 g (0.0074 mole) of PhSi(OMe)$_3$. Under a slow purge of argon, the reaction was heated to 310° C. (external thermocouple) over a period of 3.5 hours and then cooled to room temperature. The volatiles were collected in the cooled receiving flask. After work-up, 5.03 g (16.0% yield) of a yellow, soluble resin was obtained. The distillate (24.57 g) consisted of 11.1 area % hexanes, 6.8 area % Me$_2$Si(OMe)$_2$ 80.4 area % MeSi(OMe)$_3$ and 0.7 area % PhSi(OMe)$_3$.

The polymer was analyzed, and the results are reported below.

T$_g$=foamed
TGA (1000° C., N$_2$)=73.3% residue
$^1$H NMR (CDCl$_3$), a δ (ppm): 0.35 (center of broad singlet, SiMe), 3.52 (center of broad singlet, SiOMe), 7.40 (center of broad singlet, Si-Ph) SiMe/SiOMe/SiPh integration ratio=20.2/4.37/1.0
FTIR (thin film), cm$^{-1}$ (intensity): 3052 (w) 2953 (m), 2889 (m), 2834 (w), 2704 (w), 1406 (w), 1244 (m), 1180 (w), 1074 (s), 835 (m), 766 (s) 681 (m)
GPC:M$_w$=4973, M$_n$=2141
Elemental analysis: 34.9% carbon and 8.4% hydrogen

EXAMPLE 4

Using the apparatus, catalyst amount and isolation procedure of Example 2, a methylpolysilane polymer was prepared incorporating 9 mole % of a trimethoxyphenyl silane. The reactants were 30.065 g of methoxydisilanes (30.8:42.6 GC area ratio of (MeO)$_2$MeSiSi(OMe)Me$_2$ and syn-(MeO)$_4$Si$_2$Me$_2$) and 2.944 g (0.0149 mole) of PhSi(OMe)$_3$. Under a slow purge of argon, the reaction was heated to 306° C. (external thermocouple) over a period of 3.5 hours and then cooled to room temperature. The volatiles were collected in the cooled receiving flask. After work-up, 6.00 g (18.2% yield) of a yellow, soluble resin was obtained. The distillate (26.00 g) consisted of 8.6 area % hexanes, 8.0 area % Me$_2$Si(OMe)$_2$, 80.7 area % MeSi(OMe)$_3$ and 1.6 area % PhSi(OMe)$_3$.

The polymer was analyzed, and the results are reported below.

T$_g$=69.3° C.
TGA (1000° C., N$_2$=64.8% residue
$^1$H NMR (CDCl$_3$, δ (ppm): 0.35 (center of broad singlet, SiMe), 3.44 (center of multiple broad singlets, SiOMe), 7.46 (center of broad singlet, Si-Ph), 7.70 (center of broad singlet). SiMe/SiOMe/SiPh integration ratio=7.8/1.6/1.0
FTIR (thin film), cm$^{-1}$ (intensity): 3052 (w), 2953 (m), 2889 (m), 2839 (m), 2074 (w), 1406 (w), 1244 (m), 1188 (m), 1074 (s), 1032 (sh), 835 (m), 758 (s), 681 (m).
GPC: M$_w$=5805, M$_n$=1952
Elemental analysis: 45.5% silicon, 38.5% carbon and 8.0% hydrogen

EXAMPLE 5

Using the apparatus, catalyst amount and procedure of Example 2, a methylpolysilane polymer was prepared, incorporating 13 mole % of a trimethoxyphenyl silane. The reactants were 30.00 g of methoxydisilanes (30.8:42.6 GC area ratio of (MeO)$_2$MeSiSi(OMe)Me$_2$ and syn-(MeO)$_4$Si$_2$Me$_2$) and 4.42 g (0.022 mole) of PhSi(OMe)$_3$. Under a slow purge of argon, the reaction was heated to 295° C. (external thermocouple) over a period of 4.2 hours and then cooled to room temperature. The volatiles were collected in the cooled receiving flask. After work-up, 5.83 g (16.9% yield) of a yellow, soluble resin was obtained. The distillate (25.41 g) consisted of 8.4 area % hexanes, 7.9 area % Me$_2$Si(OMe)$_2$, 81.7 area % MeSi(OMe)$_3$ and 0.6 area % PhSi(OMe)$_3$.

The polymer was analyzed, and the results are reported below.

T$_g$=foamed
$^1$H NMR (CDCl$_3$), δ (ppm): 0.34 (center of broad singlet, SiMe), 3.50 (center of multiple broad singlets, SiOMe), 7.33 (center of broad singlet, Si-Ph), 7.62 (center of broad singlet, Si-Ph). SiMe/SiOMe/SiPh integration ratio=5.86/1.33/1.0
FTIR (thin film), cm$^{-1}$ (intensity): 3052 (w), 2953 (m), 2889 (m), 2834 (m), 2074 (w), 1595 (w), 1462 (w), 1406 (w), 1244 (m), 1188 (w), 1130 (m), 1074 (s), 1026 (sh), 835 (m), 766 (s), 681 (m).
GPC:M$_w$=5402, M$_n$=1948
Elemental Analysis: 43.3% silicon, 38.6% carbon and 8.1% hydrogen

EXAMPLE 6

A methylpolysilane polymer was prepared using a tetra-methoxy disilane starting material. A 3-neck 100 mL round bottom flask fitted with an argon inlet, an overhead mechanical stirrer and a 6" vigreoux connected to a short path distillation head with a cooled (−78° C.) receiving flask was cooled to 0° C. and 6.80 mL of 1.55M n-butyllithium in hexane (0.0105 mole) added followed by 0.400 mL (0.32 g 0.01 mole) of absolute methanol. The flask was warmed to room temperature and 31.50 g (0.15 mole) of 1,2-dimethyl-1,1,2,2-tetramethoxydisilane added. Under a slow purge of argon, the reaction was heated to 210° C. (external thermocouple) over a period of 2 hours and then cooled to room temperature. The volatiles were collected in the cooled receiving flask. The residue was dissolved in 40-50 mL of dry, degassed toluene and the toluene solution filtered through a pad of celite on a medium glass frit. Concentration of the filtrate at reduced pressure gave 5.19 g (16.5% yield) of a yellow, soluble resin. The distillate (23.97 g) consisted of 13.1 area % hexanes and 85.6 area % MeSi(OMe)$_3$.

The polymer was analyzed, and the results are reported below.

T$_g$>200° C.
$^1$H NMR (CDCl$_3$), δ (ppm): 0.42 (center of broad singlet, SiMe), 0.86 (center of broad singlet, SiMe), 3.53 (center of broad singlet, SiOmMe). SiMe/SiOMe ratio=2.9/1.0.
FTIR (thin film, cm$^{-1}$ (intensity): 2953 (m), 2895 (m), 2834 (m), 2074 (w), 1454 (w), 1406 (w), 1244 (m), 1180 (w), 1074 (s), 758 (s), 681 (m), 519 (s).
Elemental analysis: 46.8% silicon, 32.0% carbon and 8.3% hydrogen

EXAMPLE 7

A methylpolysilane polymer was prepared by mixing a tetra-methoxy disilane with 5 mole % of dimethoxy phenylvinylsilane (PhViSi(OMe)$_2$). A 3-neck 100 mL round bottom flask fitted with an argon inlet, an overhead mechanical stirrer and a 6" vigreoux connected to a short path distillation head with a cooled (−78° C.) receiving flask was cooled to 0° C. and 6.8 mL of 1.55M n-butyllithium in hexane (0.0105 mole) added followed by 0.400 mL (0.32 g, 0.01 mole) of absolute methanol. The flask was warmed to room temperature and 31.50 g (0.15 mole) of 1,1,2,2-tetramethoxy-1,2-dimethyldisilane and 1.457 g (0.0075 mole) of PhViSi(OMe)$_2$ added. Under a slow purge of argon, the reaction was heated to 340° C. (external thermocouple) over a period of 4 hours and then cooled to room temperature. The volatiles were collected in the cooled receiving flask. The residue was dissolved in 60 mL of dry, degassed toluene and the toluene solution filtered through a pad of celite on a medium glass frit. Concentration of the filtrate at reduced pressure gave 4.955 g (15.0% yield) of a yellow, soluble resin. The distillate (22.5 g) consisted 1.0 area % hexanes and 98.2 area % MeSi(OMe)$_3$.

The polymer was analyzed, and the results are reported below.

T$_g$=foamed
TGA (1000° C., N$_2$)=66.0% residue
$^1$H NMR (d$_8$ toluene), δ (ppm); 0.57 (center of broad singlet), SiMe), 3.40 (center of multiple broad singlets, SiOMe), 6.92 (center of broad singlet, Si-Ph), 7.13 (center of broad singlet, Si-Ph), 7.70 (center of broad singlet).
SiMe/SiOMe/SiPh integration ratio=7.6/2.6/1.0.
FTIR (thin film), cm$^{-1}$ (intensity): 3052 (w), 2959 (m), 2889 (m), 2834 (m), 2074 (w), 1462 (w), 1406 (w), 1244 (m), 1188 (m), 1074 (s), 1026 (m), 835 (w), 758 (s).
GPC: M$_w$=27709, M$_n$=3132
Elemental Analysis: 42.6% silicon, 37.4% carbon and 8.4% hydrogen

EXAMPLE 8

A methylpolysilane polymer was prepared by mixing a tetra-methoxy disilane with 9 mole % of dimethoxy phenylvinylsilane. A 3-neck 100 mL round bottom flask fitted with an argon inlet, an overhead mechanical stirrer and a 6" vigreoux connected to a short path with a cooled (−78° C.) receiving flask was cooled to 0° C. and 6.8 mL of 1.55M n-butyllithium in hexane (0.0105 mole) added followed by 0.400 mL (0.32 g 0.001 mole) of absolute methanol. The flask was warmed to room temperature and 31.50 g (0.15 mole) of 1,1,2,2-tetramethoxy-1,2-dimethyldisilane and 2.907 g (0.015 mole) of PhViSi(OMe)$_2$ added. Under a slow purge of argon, the reaction was heated to 160° and both the distillate and the pot analyzed by GC. The only elutable product in both the pot and the distillate was MeSi(OMe)$_3$.

The reaction was heated to a final temperature of 280° C. (external thermocouple) over a period of 4 hours and then cooled to room temperature. The volatiles were collected in the cooled receiving flask. The residue was dissolved in 60 mL of dry, degassed toluene and the toluene solution filtered through a pad of celite on a medium glass frit. Concentration of the filtrate at reduced pressure gave 5.94 g (17.3% yield) of a yellow, soluble resin. The distillate (21.7 g) consisted of 0.5 area % hexanes and 97.3 area % MeSi(OMe)$_3$.

The polymer was analyzed and the results are reported below.

$T_g = 119.4°$ C.

TGA (1000° C., N$_2$) = 64.9% residue $^1$H NMR (CDCl$_3$) δ (ppm): 0.31 (center of broad singlet, SiMe), 3.37 (center of multiple broad singlets, SiOMe), 7.25 (center of broad singlet, Si-Ph), 7.52 (center of broad singlet, Si-Ph). SiMe/SiOMe/SiPh integration ratio = 4.9/1.8/1.0

GPC: Mw = 16590, Mn = 2617

FTIR (thin film), cm$^{-1}$ (intensity): 3052 (w), 2953 (m), 2889 (m), 2834 (m), 2074 (w), 1462 (w), 1427 (w), 1406 (w), 1244 (m), 1188 (m), 1082 9s), 1018 (m), 766 (s), 702 (m), 681 (m).

Elemental Analysis: 41.2% Carbon, 33.9% Silicon, 8.1% Hydrogen

EXAMPLE 9

A methylpolysilane was prepared by mixing a tetra-methoxy disilane with 13 mole % of dimethoxyphenylvinylsilane. A 3-neck 100 mL round bottom flask fitted with an argon inlet, an overhead mechanical stirrer and a 6" vigreoux connected to a short path distillation head with a cooled (−78° C.) receiving flask was cooled to 0° C. and 6.8 ml of 1.55M n-butyllithium in hexane (0.0105 mole) added followed by 0.400 mL (0.32 g, 0.001 mole) of absolute methanol. The flask was warmed to room temperature and 31.50 g (0.15 mole) of 1,1,2,2-tetramethoxy-1,2-dimethyldisilane and 4.370 g (0.0225 mole) of PhViSi(OMe)$_2$ added. Under a slow purge of argon, the reaction was heated to 290° C. (external thermocouple) over a period of 4 hours and then cooled to room temperature. The volatiles were collected in the cooled receiving flask. The residue was dissolved in 50 ml of dry, degassed toluene and the toluene solution filtered through a pad of celite on a medium glass frit. Concentration of the filtrate at reduced pressure gave 7.49 g (20.9% yield) of a yellow, soluble resin. The distillate (24.8 g) consisted of 7.3 area % hexanes and 91.3 area % MeSi(OMe)$_3$.

The polymer was analyzed, and the results reported below.

$T_g = 47.5°$ C.

TGA (1000° C., N$_2$) = 56.6% residue $^1$H NMR (CDCl$_3$), δ (ppm): 0.35 (center of broad singlet, SiMe), 3.34 (broad singlets, SiOMe), 3.52 (broad singlet, Si-Ph). SiMe/SiOMe/SiPh integration ratio = 3.9/2.1/1.0

FTIR (thin film), cm$^{-1}$ (intensity): 3052 (w), 2938 (m), 2895 (m), 2834 (m), 2095 (w), 1468 (w), 1427 (w), 1406 (w), 1244 (m), 1188 (m), 1090 (s), 1018 (m), 766 (s), 702 (m), 505 (s).

GPC: Mw = 14298, Mn = 2723

Elemental Analysis: 35.5% silicon, 43.8% carbon and 8.6% hydrogen.

EXAMPLE 10

A methylpolysilane polymer was prepared by mixing a tetra-methoxy disilane with 9 mole % of a methylmethoxy phenylvinylsilane (PhVi(Me)SiOMe). A 3-neck 100 mL round bottom flask fitted with an argon inlet, an overhead mechanical stirrer and a 6" vigreoux connected to a short path distillation head with a cooled (−78° C.) receiving flask was cooled to 0° C. and 6.8 mL of 1.55M n-butyllithium (0.0105 mole) added followed by 0.400 ml (0.32 g 0.001 mole) of absolute methanol. The flask was warmed to room temperature and 31.50 g (0.15 mole) of 1,1,2,2-tetramethoxy-1,2-dimethyldisilane and 2.67 g (0.015 mole) of PhVi(Me)SiOMe added. Under a slow purge of argon, the reaction was heated to 285° C. (external thermocouple) over a period of 1.5 hours and then cooled to room temperature. The volatiles were collected in the cooled receiving flask. The residue was dissolved in 50 mL of dry, degassed toluene and the toluene solution filtered through a pad of celite on a medium glass frit. Concentration of the filtrate at reduced pressure gave a yellow, soluble resin. 24.8 g of a clear distillate was obtained. No PhVi(Me)SiOMe was observed in either the filtrate or in the distillate.

The resin was found to have a Tg = 132.3° C.

EXAMPLE 11

An attempt was made to incorporate methyl dimethoxyphenylsilane, PhMeSi(OMe)$_2$, into a methylpolysilane using a tetra-methoxy disilane starting material. A 3-neck 100 mL round bottom flask fitted with an argon inlet, an overhead mechanical stirrer and a 6" vigreoux connected to a short path distillation head with a cooled (−78° C.) receiving flask was cooled to 0° C. and 6.8 mL of 1.55M n-butyllithium in hexane (0.0105 mole) added followed by 0.400 mL (0.32 g 0.001 mole) of absolute methanol. The flask was warmed to room temperature and 31.50 g (0.15 mole) of syn-(MeO)$_4$Si$_2$Me$_2$ and 4.08 g (0.022 mole) of PhMeSi(OMe)$_2$ added. Under a slow purge of argon, the reaction was heated to 217° C. (external thermocouple) over a period of 3.0 hours and then cooled to room temperature. The distillate yield was 26.2 g. The residue was dissolved in toluene and an aliquot analyzed by gas chromatography. Approximately 8 area % of the analyte was PhMeSi(OMe)$_2$. Assuming a response factor of 1 for both the disilane and the PhMeSi(OMe)$_2$, this corresponds to approximately 4 grams of PhMeSi(OMe)$_2$, i.e., no reaction.

EXAMPLE 12

The polymers from Examples 2–10 were weighed into alumina boats inside a VAC inert atmosphere box. The samples were transferred, inside a sealed bag, to a 2" Lindberg tube furnace. The samples were removed from the bag, rapidly transferred into the center of the furnace tube. The furnace tube was evacuated to 0.5 torr and then backfilled with ultra high purity argon. The evacuation/backfilling procedure was repeated two more times. A constant purge of argon was swept through the tube and the samples heated to 1200° C. at 5°/minute with a two hour hold at 1200° C. After cooling to room temperature, the chars were removed from the furnace, weighed and portions submitted for silicon, oxygen, carbon, hydrogen, and nitrogen analysis. The elemental analysis data for the chars is summarized in Table 1.

TABLE 1

| Example | Polymer | Char Yield TGA | Char Yield Bulk | 1200° (Argon) Char Analysis | | |
|---|---|---|---|---|---|---|
| | | | | Silicon | Carbon | Oxygen |
| 2 | MPS-OMe | 44.6 | 27.7 | 64.8 | 24.8 | 5.7 |
| 3 | MPS-Ph-OMe | 73.3 | 52.6 | 62.7 | 27.4 | 6.2 |
| 4 | MPS-Ph-OMe | 64.8 | 56.7 | 61.2 | 29.2 | 7.0 |
| 5 | MPS-Ph-OMe | 57.4 | 49.3 | 59.6 | 28.4 | 7.9 |
| 6 | MPS-OMe | — | 52.2 | 65.4 | 22.6 | 7.9 |
| 7 | MPS-PhViSi-OMe | 66.0 | 63.8 | 55.7 | 33.6 | 7.1 |
| 8 | MPS-PhViSi-OMe | 64.9 | 61.8 | 51.3 | 37.4 | 8.2 |
| 9 | MPS-PhViSi-OMe | 56.6 | 36.9 | 48.0 | 40.4 | 8.4 |
| 10 | MPS-PhViMeSi-OMe | 63.2 | 46.0 | 53.7 | 35.9 | 7.5 |

In accordance with the practice of the present invention, the use of unsaturated methoxy silane starting materials (Examples 3-5 and 7-10, has the effect of not only increasing the carbon content in the polymer, but also retaining that additional carbon in the ceramic char after pyrolysis.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A process for the preparation of a methylpolysilane having a controlled carbon content comprising the steps of:
   (a) heating together to form a reaction mixture at least one alkoxy-functional disilane selected from the group consisting of disilanes having two, three, and four alkoxy groups bonded to the silicon atoms, and mixtures thereof, with an alkoxy-functional silane having at least one unsaturated substituent in an amount effective to increase the carbon content of the resulting polymer, said alkoxy-functional silane having a boiling point of at least about 110° C., in the presence of a catalyst which is a source of alkoxide ions;
   (b) reacting said mixture for a time sufficient for an alkoxy-functional methylpolysilane to form while separating by-produced volatile alkoxysilane materials from said reaction mixture; and
   (c) separating said catalyst from said alkoxy-functional methylpolysilane which has formed.

2. The process of claim 1 in which said alkoxy-functional silane having at least one unsaturated substituent is selected from the group consisting of vinyl silanes, aryl silanes, and arylalkyl silanes.

3. The process of claim 1 in which said alkoxy-functional silane is dimethoxyphenylvinyl silane or methoxymethylphenylvinylsilane.

4. The process of claim 1 in which said alkoxy-functional silane is added in an amount of between about 1 to about 20 mole % of said alkoxy-functional disilane.

5. The process of claim 1 in which said alkoxy-functional silane is added in an amount of between about 5 to about 15 mole % of said alkoxy-functional disilane.

6. The process of claim 1 in which said reaction mixture is heated at a rate of between about 1° about 5° C. per minute to a temperature of between about 200° to about 320° C.

7. The process of claim 1 in which said catalyst is present in an amount of about 1.0% by weight.

8. The process of claim 1 in which said at least one alkoxy-functional disilane has from 1 to 4 carbon atoms in said alkoxy substituents.

9. The product produced by the process of claim 1.

10. A process for the preparation of a methylpolysilane having a controlled carbon content comprising the steps of:
    (a) heating together to form a reaction mixture at least one alkoxy-functional disilane selected from the group consisting of disilanes having two, three, and four alkoxy groups bonded to the silicon atoms, and mixtures thereof, with an unsaturated hydrocarbon compound in an amount effective to increase the carbon content of the resulting polymer, said unsaturated hydrocarbon compound having a boiling point of at least about 110° C., in the presence of a catalyst which is a source of alkoxide ions;
    (b) reacting said mixture for a time sufficient for an alkoxy-functional methylpolysilane to form while separating by-produced volatile alkoxysilane materials from said reaction mixture; and
    (c) separating said catalyst from said alkoxy-functional methylpolysilane which has formed.

11. The process of claim 10 in which said unsaturated hydrocarbon compound is selected from the group consisting of phenylacetylene, divinylbenzene, and diphenylacetylene.

12. The process of claim 10 in which said unsaturated hydrocarbon compound is divinylbenzene.

13. The process of claim 10 in which said unsaturated hydrocarbon compound is added in an amount of between about 1 to about 20 mole % of said alkoxy-functional disilane.

14. The process of claim 10 in which said unsaturated hydrocarbon compound is added in an amount of between about 5 to about 15 mole % of said alkoxy-functional disilane.

15. The process of claim 10 in which said reaction mixture is heated at a rate of between about 3° to about 5° C. per minute to a temperature of between about 200° to about 320° C.

16. The process of claim 10 in which said catalyst is present in an amount of about 1.0% by weight.

17. The process of claim 10 in which said at least one alkoxy-functional disilane has from 1 to 4 carbon atoms in said alkoxy substituents.

18. The product produced by the process of claim 10.

* * * * *